(Model.)
J. KING.
SEED CUP FOR GRAIN DRILLS.
No. 253,926. Patented Feb. 21, 1882.
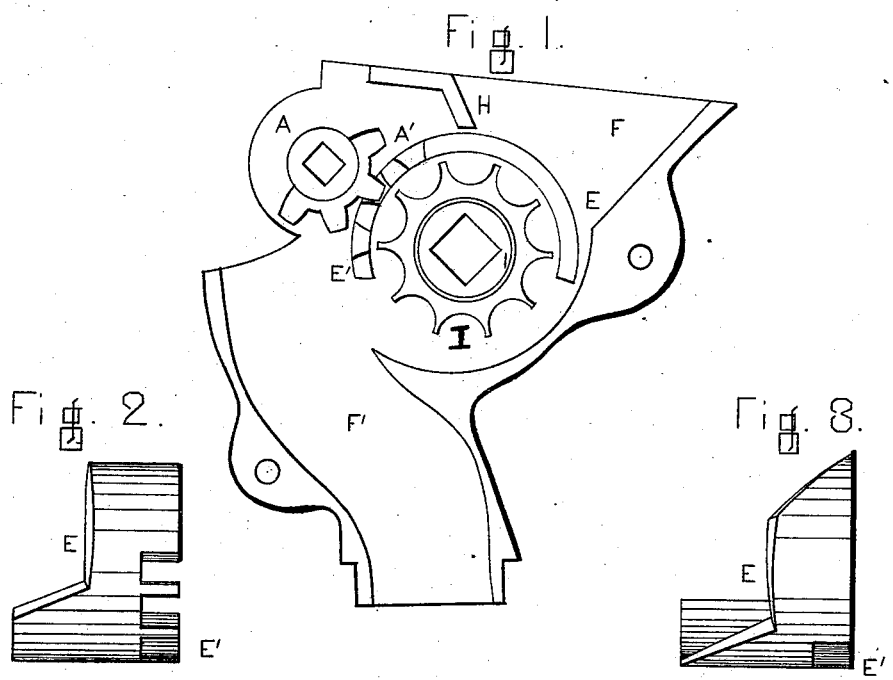
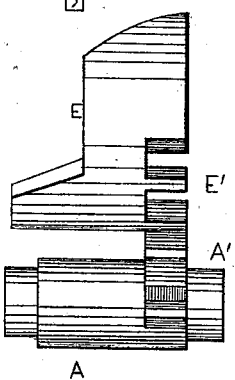
Witnesses
Fred Werbe
F. M. McDonald
Inventor
Jacob King
By E. E. McDonald
his Attorney
N. PETERS. Photo-Lithographer, Washington, D. C.

UNITED STATES PATENT OFFICE.

JACOB KING, OF INDIANAPOLIS, INDIANA.

SEED-CUP FOR GRAIN-DRILLS.

SPECIFICATION forming part of Letters Patent No. 253,926, dated February 21, 1882.

Application filed July 9, 1881. (Model.)

*To all whom it may concern:*

Be it known that I, JACOB KING, of Indianapolis, Marion county, Indiana, have invented an Improvement in Seed-Cups for Grain-Drills, of which the following is a specification.

The nature and object of the invention will be fully understood from the following general description and the annexed drawings.

Figure 1 is a view of the interior of the seed-cup. Figs. 2 and 3 are views of the cut-off slide E E'; Fig. 4, a view showing the teeth of the segmental pinion A' in gear with the teeth E' of the cut-off slide E E'.

The seed-cup is made of the form shown in outline by F F' of Fig. 1.

A is a shaft reaching from side to side of the cup, and having bearings for its ends in the walls of the cup. Upon this shaft A is constructed the segmental spur-pinion A'. This segmental pinion A' gears into E', which is a set of spur-gear teeth cut in the cut-off slide E E'. This slide E E' is in the form of a segment of a hollow cylinder of the particular form shown by E E' of Figs. 1, 2, 3, and 4 of said drawings. In the wall of the seed-cup F F' is constructed an annular groove directly opposite E E' of Fig. 1 on both sides of the cup, to accommodate the sliding edges of the slide E E'. The grain comes into the cup at F and falls upon and around the convex surface of the slide E E'. This slide is cut away at E, as shown in Figs. 2, 3, and 4, so that it does not entirely cover the teeth of the feed-wheel I, so that at all times when the feed-wheel I is in motion the grain will pass under the feed-wheel I from F and down through F' toward the ground. If by moving the pinion A' the slide E E' be pushed as far as it will go toward the side opposite the shaft A of Fig 1, the minimum of grain will pass under the feed-wheel I, because the slide E E' will in that position cover its greatest space of the teeth of the feed-wheel, thereby preventing all but a small amount of grain from running under the feed-wheel I; but if the said slide E E' be turned in the direction toward the shaft A of said Fig. 1, then the greatest amount of grain will pass under the feed-wheel I, because in that position the slide E E' covers the least space of the teeth of the feed-wheel. By placing said slide E E' in any desired position between these two points the flow of grain can be regulated to suit the pleasure of the operator.

The slide E E' may be connected from point to point by a narrow segment, of the same cylinder of which it forms a part, so that the slide may become an unbroken ring of the form described, reaching around the entire circumference of the cylinder; but I now think the form shown in the drawings the best.

This seed-cup is to be used as herein described upon all grain-drills which have seed-cups having toothed revolving feed-wheels.

I claim—

1. In a seed-cup for grain-drills, the segmental pinion A', constructed and arranged to gear into the teeth E' of the cylindrical slide E E', substantially as and for the purpose set forth.

2. In a seed-cup for grain-drills, the combination and arrangement of the segmental pinion A', the teeth E', and the cylindrical slide E E', substantially as and for the purpose set forth.

In testimony that I claim the foregoing specification I have hereunto set my hand this 27th day of June, 1881.

JACOB KING.

Attest:
FRED WERBE,
F. M. MCDONALD.